United States Patent
Ferron

(10) Patent No.: US 7,819,278 B2
(45) Date of Patent: Oct. 26, 2010

(54) HANDLE FOR A PAN OR A SIMILAR KITCHEN VESSEL

(75) Inventor: Jacopo Ferron, Padua (IT)

(73) Assignee: Ballarini Paolo & Figli S.p.A., Rivarolo Mantovano (IT)

( * ) Notice: Subject to any disclaimer, the term of this patent is extended or adjusted under 35 U.S.C. 154(b) by 20 days.

(21) Appl. No.: 12/080,241

(22) Filed: Apr. 1, 2008

(65) Prior Publication Data
US 2008/0245805 A1    Oct. 9, 2008

(30) Foreign Application Priority Data
Apr. 4, 2007    (IT) .......................... MI2007A0697

(51) Int. Cl.
*B65D 25/28* (2006.01)
*A47J 27/00* (2006.01)
*A47J 36/00* (2006.01)

(52) U.S. Cl. ........................ 220/755; 220/573.1; 16/425
(58) Field of Classification Search .............. 220/573.1, 220/752, 753; 16/421, 425
See application file for complete search history.

(56) References Cited

U.S. PATENT DOCUMENTS 2,231,222 A * 2/1941 Rosenheimer, Jr. ......... 220/755
5,902,623 A * 5/1999 Cochran ..................... 426/466

* cited by examiner

*Primary Examiner*—Harry A Grosso
(74) *Attorney, Agent, or Firm*—Kirschstein, et al.

(57) ABSTRACT

A handle for a pan or a similar kitchen vessel comprises a handle supporting core integral with the pan body and combined by two reinforcement half-bodies made of a heat resistant material, the pan handle including reinforcement half bodies being coated by a silicone resin coating sheath.

9 Claims, 3 Drawing Sheets

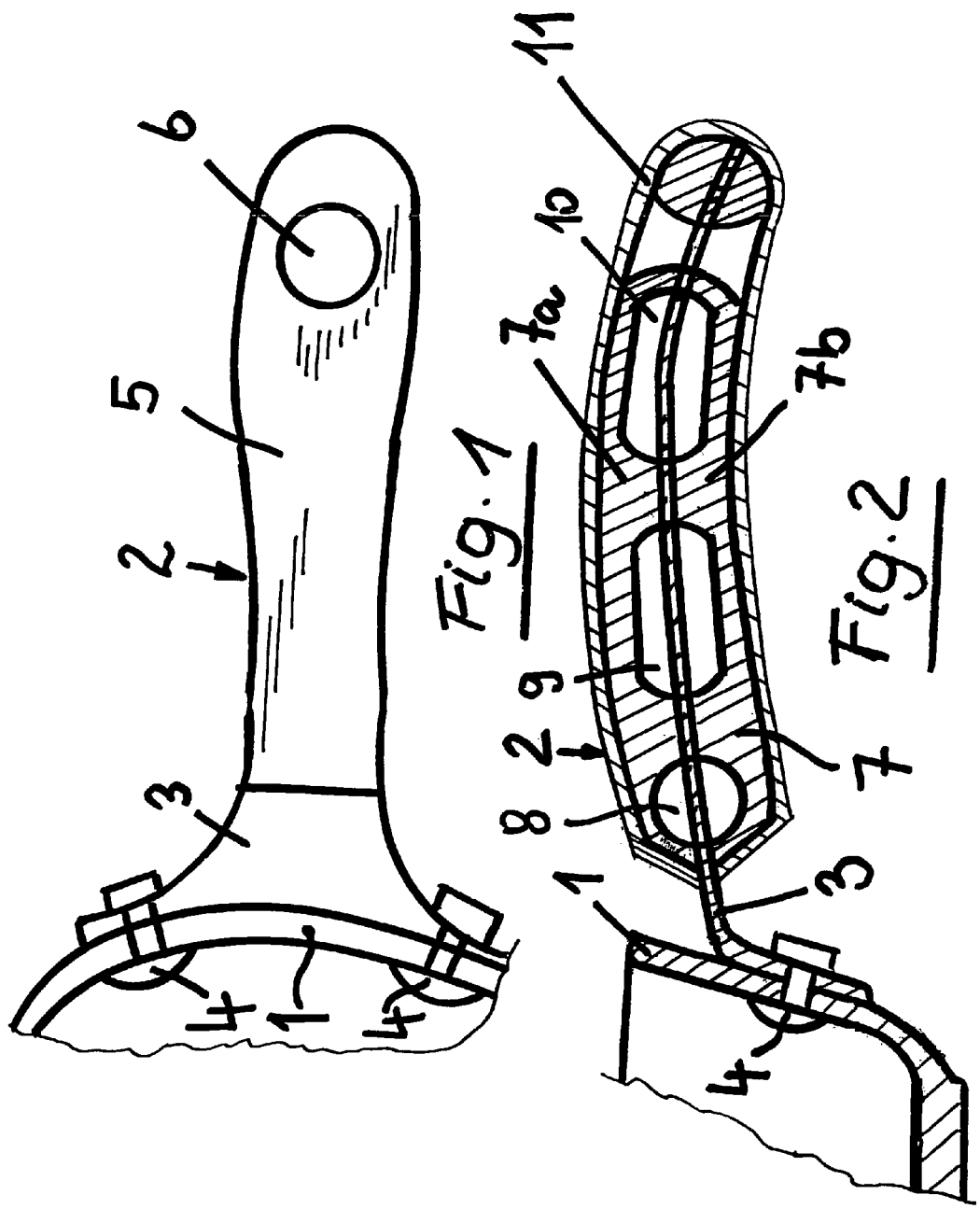

HANDLE FOR A PAN OR A SIMILAR KITCHEN VESSEL

BACKGROUND OF THE INVENTION

The present invention relates to a handle for a pan or a similar kitchen vessel.

Several pan handles are known from the prior art.

Thus, for example, a pan handle comprising a steel tube is already known in the art.

Such a steel tube handle, however, has the drawback that, during the cooking operation, the handle can be excessively heated, thereby it is necessary to provide between the pan body and handle thermally insulating means, which make the assembling of the handle more complex and expensive.

In another prior pan handle, the handle metal core, integral with the pan, is coated by wood insulating elements: however, this approach has been found as insufficiently practical, since the wood coating is affected, upon a continued use, by the heat source and the required washing and cleaning operations, causing, upon a prolonged period of use, the handle to be partially destroyed.

Yet another approach provides to coat the pan handle, projecting from the pan body, by synthetic materials, i.e. thermosetting and heat resistant resins, such as phenolic resins.

To provide such a synthetic material handle, the metal core is coated, in an overmolding method, by a synthetic material, which is a slow, expensive and complex making procedure.

Recently, pan handles integrally consisting of silicone have also been made by injecting into a suitable mold housing the metal core pan assembly a silicone base insulating material.

Also known is the fact that a pan handle integrally made of a silicone is commercially unsupportable, just due to the very high cost of the silicone resin and the processing methods therefor.

SUMMARY OF THE INVENTION

Accordingly, the object of the present invention is to overcome the above mentioned prior art drawbacks by providing a handle for a pan or similar kitchen vessel having all the advantages of a silicone resin handle, which can be made in a very inexpensive manner, has a small weight and a very high mechanical and thermal stress resistance.

According to the present invention, the above mentioned object is achieved by a handle for a pan or similar kitchen vessel, including a supporting core integral with the pan body and enclosed by two pan-handle reinforcement half bodies made of a heat resistant forming material, characterized in that said pan handle forming half-bodies are coated by a coating sheath made of a silicone resin.

BRIEF DESCRIPTION OF THE DRAWINGS

The subject matter of the present invention will be disclosed in a more detailed manner hereinafter with reference to an exemplary embodiment thereof, as shown in the accompanying drawings, where:

FIG. 1 is a top plan view showing a handle according to the present invention;

FIG. 2 is a longitudinal section of the pan handle shown in FIG. 1;

DESCRIPTION OF THE PREFERRED EMBODIMENT

Figure 3:
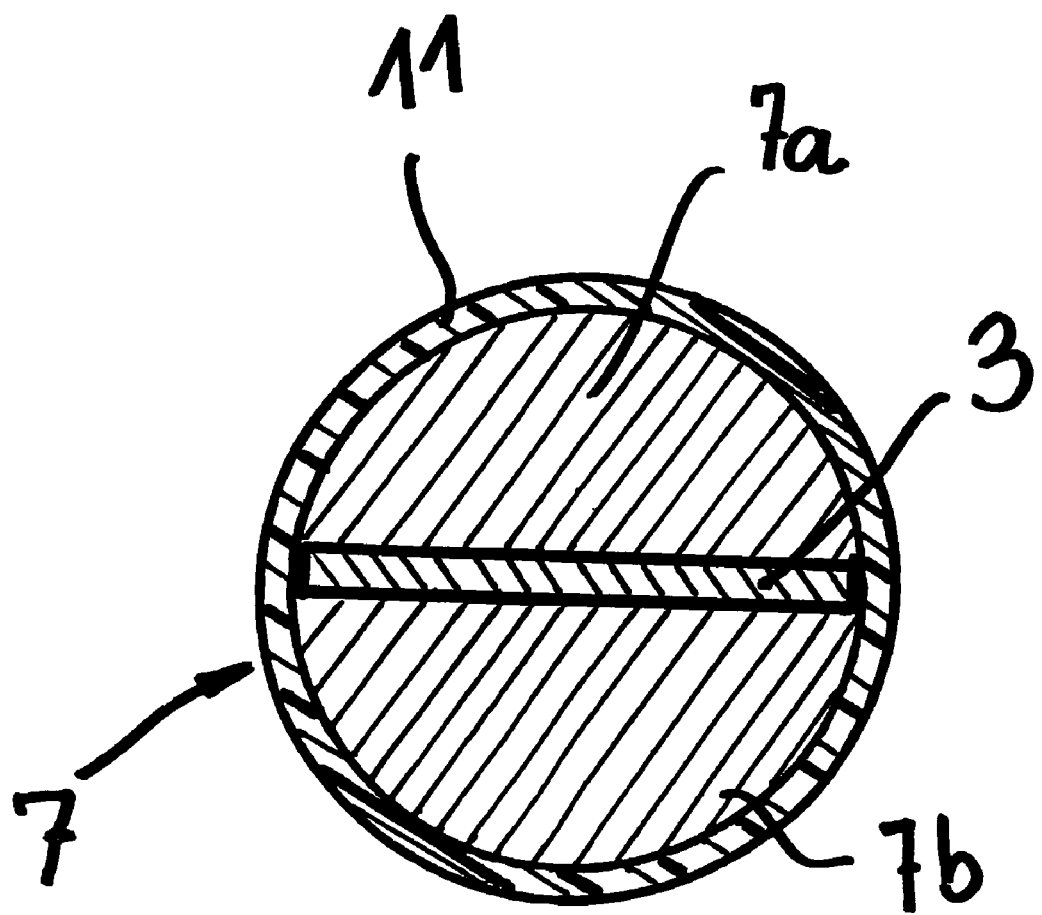
FIG. 3 is a cross sectional view of the handle of FIGS. 1 and 2.

As is shown in FIG. 1, a pan 1 comprises a handle 2 coupled thereto.

Said handle 2 comprises a handle core made of a thin sheet metal, the core 3 being fixedly coupled, by coupling rivets 4, to the body of the pan 1.

As is clearly shown in FIG. 2, the core 3 of the handle 2 comprises a sheet metal element, radially projecting from the body of the pan 1 and being coupled by said coupling rivets 4, or other suitable coupling means, to the body of the pan 1.

The sheet metal core 3 is enclosed by a reinforcement body, generally indicated by 7, said body 7 being made of a very inexpensive heat resistant and easily machinable material.

In particular, said body 7 can comprise a single body applied on the core 3 by injecting a suitable injection material or it can be made of two parts 7a and 7b which may be glued to one another or assembled along mutual contacting surfaces by mechanical coupling means 21, 22, by forming, for example, suitable openings 22 through one said part 7b of the handle 7, with cut-out recesses, and by providing on the second part 7a of the handle 7 corresponding projections to be engaged or fitted to the cut-out regions.

Moreover, the two half-bodies 7a and 7b define, inside the handle 7, large openings 8, 9 and 10 for lightening the handle 7, while providing stiffing ribs.

As thereinabove mentioned, the body of the handle 7 applied on the core 3 comprises a light and inexpensive thermal stress resistant material.

To provide the handle 7 with firm coupling, good aesthetical and advantageous target tactile properties, the overall handle 7, made of a support material, is coated by a thin coating silicone sheath 11; thus, by gripping the handle 7, a user of the pan 1 would have a feeling of gripping a handle integrally made of a silicone resin.

Advantageously, the silicone resin coating sheath 11 constitutes the binding element for assembling and binding the half bodies 7a and 7b and metal core 3.

Advantageously, the silicone coating sheath 11 is made of a clear and transparent silicone resin, thereby it will be possible to apply on the exposed to the view surfaces of the handle 7 trademarks, patterns, graphic signs, or any desired colors to be clearly seen through the transparent sheath 11.

Figure 4:
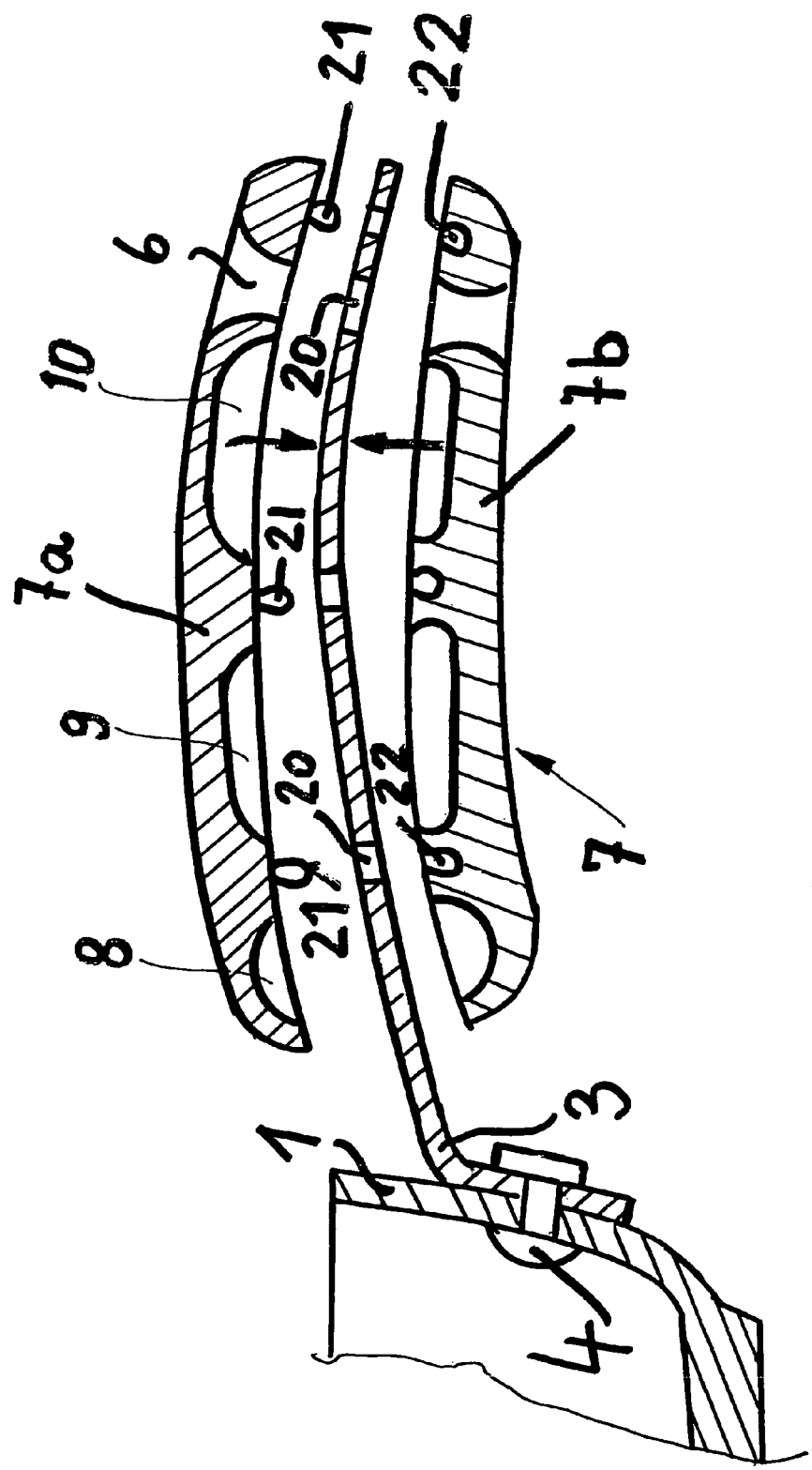
FIG. 4 is a further sectional view showing the two separated handle half-bodies and the metal core therefor.

As is shown in FIG. 4, to firmly assemble the parts 7a, 7b of the handle 7, the part 7a comprises a plurality of projections 21 facing the support core 3, which projections, in assembling the parts 7a, 7b, will pass through the holes 20 of the core 3, to snap engage in corresponding openings 22 formed in the handle part 7b (FIG. 4).

The invention claimed is:

1. A handle for a kitchen vessel, comprising:
    an elongated core of sheet material connected to, and extending longitudinally away from, the vessel, the core having upper and lower surfaces;
    a pair of reinforcement bodies of a heat-resistant material, the reinforcement bodies having inner surfaces contacting and reinforcing the upper and lower surfaces of the core at a plurality of contact locations spaced longitudinally apart from one another, the contact locations extending transversely across the core, the reinforcement bodies having outer curved surfaces that together form a cylindrical shape; and an outer tubular sheath of a silicone resin material surrounding the outer curved surfaces of the reinforcement bodies and the core, the tubular sheath mechanically binding and holding the reinforcement bodies and the core together as an assembly.

2. The handle according to claim 1, wherein the core is made of sheet metal.

3. The handle according to claim 1, wherein each reinforcement body is made of a moldable, machinable material having a half-cylindrical shape.

4. The handle according to claim 1, wherein the reinforcement bodies have weight-reducing openings that face each other between the contact locations.

5. The handle according to claim 1, wherein the tubular sheath has a thickness from one to three millimeters.

6. The handle according to claim 1, wherein the reinforcement bodies are mechanically coupled together at their contact locations.

7. The handle according to claim 6, wherein one of the reinforcement bodies has projections, and the other of the reinforcement bodies has recesses for receiving the projections with a latching action.

8. The handle according to claim 7, wherein the core has holes through which the projections extend.

9. The handle according to claim 1, wherein the tubular sheath is made of a light-transmissive material through which indicia on the core is visible.

* * * * *